United States Patent
Bos et al.

(10) Patent No.: US 10,873,459 B2
(45) Date of Patent: Dec. 22, 2020

(54) PASSWORD AUTHENTICATION USING WHITE-BOX CRYPTOGRAPHY

(71) Applicant: NXP B.V., Eindhoven (NL)

(72) Inventors: Joppe Willem Bos, Wijgmaal (BE);
Rudi Verslegers, Genk (BE);
Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 191 days.

(21) Appl. No.: 16/140,029

(22) Filed: Sep. 24, 2018

(65) Prior Publication Data
US 2020/0099525 A1    Mar. 26, 2020

(51) Int. Cl.
*H04L 9/32* (2006.01)
*G06F 21/45* (2013.01)

(52) U.S. Cl.
CPC ............ *H04L 9/3226* (2013.01); *G06F 21/45* (2013.01); *H04L 9/3236* (2013.01); *H04L 2209/16* (2013.01)

(58) Field of Classification Search
CPC . H04L 9/3226; H04L 9/3236; H04L 2209/16; G06F 21/45
USPC ........................................................ 713/183
See application file for complete search history.

(56) References Cited

U.S. PATENT DOCUMENTS

| | | | |
|---|---|---|---|
| 2010/0215175 A1* | 8/2010 | Newson | G06F 21/6218 380/44 |
| 2013/0212385 A1* | 8/2013 | Schechter | H04L 9/0877 713/168 |
| 2014/0032922 A1 | 1/2014 | Spilman | |
| 2016/0044034 A1* | 2/2016 | Spilman | G06F 21/6209 713/181 |
| 2016/0080144 A1* | 3/2016 | Choi | H04L 9/0637 380/44 |
| 2017/0063975 A1* | 3/2017 | Prakash | H04L 67/1002 |

FOREIGN PATENT DOCUMENTS

WO    WO-2018/035371 A1    2/2018

OTHER PUBLICATIONS

Park, Whitebox Cryptography application for Mobile device security against whitebox attacks, 2014, IEEE, 978-1-4799-6541/14, 2014 (Year: 2014).*
Benzekki et al., "DePass: A secure hash-based authentication scheme," doi: 10.1109/ISACV.2017.8054986, 2017, pp. 1-8. (Year: 2017).*
S. Chow, et al. "White-Box Cryptography and an AES Implementation, Selected Areas in Cryptography", Lecture Notes in Computer Science, vol. 2595, pp. 250-270. (2003).

(Continued)

*Primary Examiner* — Peter C Shaw

(57) ABSTRACT

A white-box system for authenticating a user-supplied password, including: a password database including a salt value and an authentication value for each user; a white-box implementation of a symmetric cipher configured to produce an encrypted value by encrypting the user-supplied password using the salt value associated with the user as an encoded secret key; and a comparator configured to compare the encrypted value with the authentication value associated with the user to verify the user-supplied password.

9 Claims, 3 Drawing Sheets

(56) References Cited

OTHER PUBLICATIONS

S. Chow, et al. "White-Box DES Implementation for DRM Applications", Digital Rights Management—DRM 2002, Lecture Notes in Computer Science, vol. 2696, pp. 1-15. (2003).
Gu, Yuan Xiang et al., "White-Box Cryptography: Practical Protection on Hostile Hosts;" Proceedings of the 6th Workshop on Software Security, Protection, and Reverse Engineering; Article No. 4, pp. 1-8; Dec. 2016; doi.org/10.1145/3015135.3015139.

* cited by examiner

PASSWORD AUTHENTICATION USING WHITE-BOX CRYPTOGRAPHY

TECHNICAL FIELD

Various exemplary embodiments disclosed herein relate generally to password authentication using white-box cryptography.

BACKGROUND

It is common practice that a user requires a password in order to login to a specific service. However, when the password database is obtained various off-line attacks can be mounted (such as dictionary attacks or rainbow attacks). Even when countermeasures are applied, such as using a salt, a (modified) brute-force search can be mounted.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a white-box system for authenticating a user-supplied password, including: a password database including a salt value and an authentication value for each user; a white-box implementation of a symmetric cipher configured to produce an encrypted value by encrypting the user-supplied password using the salt value associated with the user as an encoded secret key; and a comparator configured to compare the encrypted value with the authentication value associated with the user to verify the user-supplied password.

Various embodiments are described, wherein the white-box implementation of the symmetric cipher is bound to a specific platform.

Various embodiments are described, wherein the password database includes other user data that is encrypted using the white-box implementation of the symmetric cipher and the salt value associated with the user.

Various embodiments are described, further including a hash function configured to hash the user-supplied password before being input into the white-box implementation of the symmetric cipher.

Further various embodiments relate to a method for authenticating a user-supplied password using a password database including a salt value and an authentication value for each user, including: receiving the user-supplied password; encrypting, by a white-box implementation of a symmetric cipher, the user-supplied password using the salt value associated with the user as an encoded secret key to produce an encrypted value; and comparing the encrypted value with the authentication value associated with the user to verify the user-supplied password.

Various embodiments are described, wherein the white-box implementation of the symmetric cipher is bound to a specific platform.

Various embodiments are described, further including encrypting other user data using the white-box implementation of the symmetric cipher and the salt value associated with the user.

Various embodiments are described, further including hashing the user-supplied password before encrypting the user-supplied password.

Further various embodiments relate to a non-transitory machine-readable storage medium encoded with instructions for authenticating a user-supplied password using a password database including a salt value and an authentication value for each user, the non-transitory machine-readable storage medium including: instructions for receiving the user-supplied password; instructions for encrypting, by a white-box implementation of a symmetric cipher, the user-supplied password using the salt value associated with the user as an encoded secret key to produce an encrypted value; and instructions for comparing the encrypted value with the authentication value associated with the user to verify the user-supplied password.

Various embodiments are described, wherein the white-box implementation of the symmetric cipher is bound to a specific platform.

Various embodiments are described, further including instructions for encrypting other user data using the white-box implementation of the symmetric cipher and the salt value associated with the user.

Various embodiments are described, further including instructions for hashing the user-supplied password before encrypting the user-supplied password.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
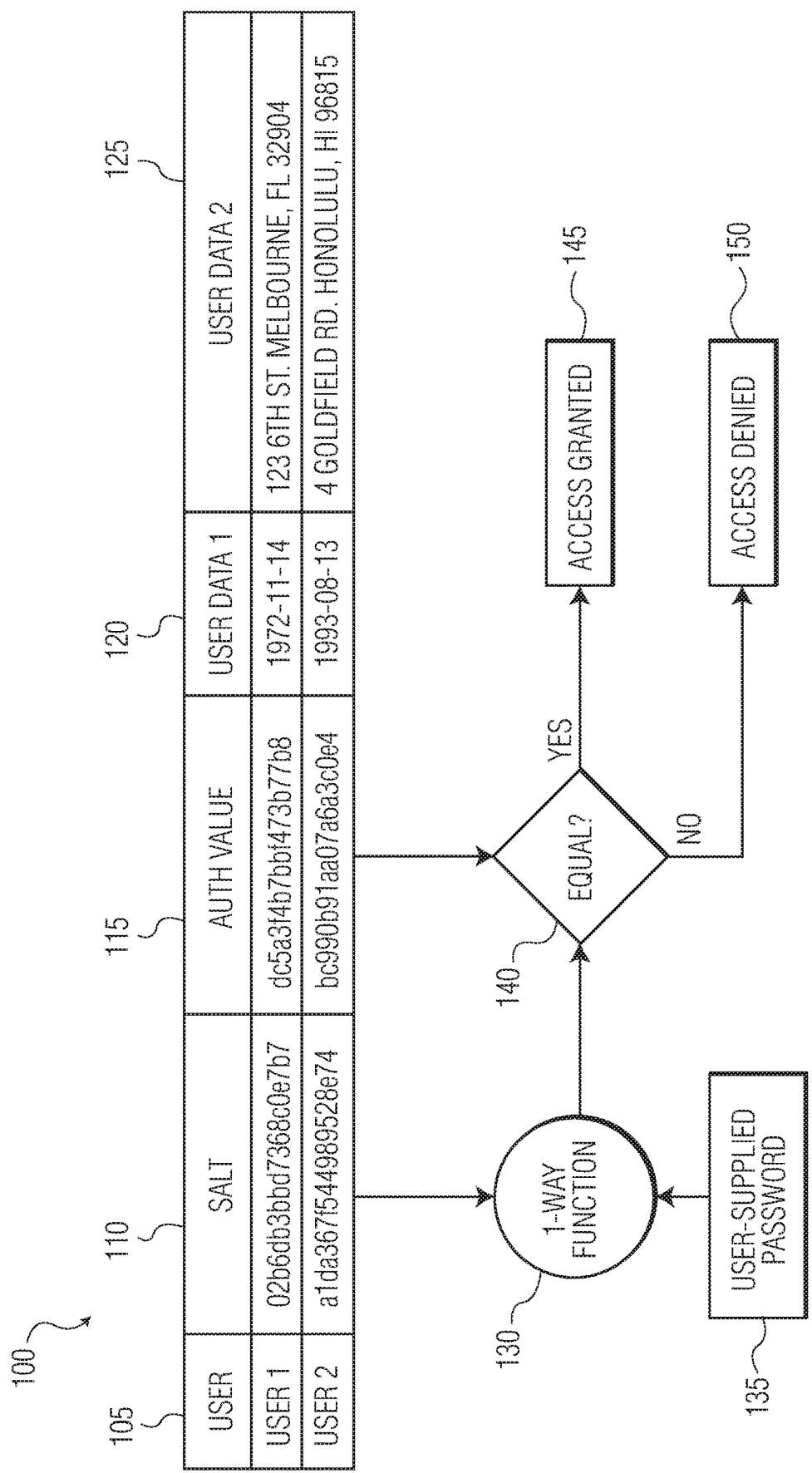
FIG. 1 illustrates the use of a salt in verifying a user password.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments are described herein that enhance the security of off-line attacks against password authentication using white-box cryptography. Moreover, these embodiments include additional features which allow for the encryption of other entries associated with a specific user in a database where the authentication information is stored.

White-box cryptography is aimed at protecting secret keys from being disclosed in a software implementation of a cryptographic function. In such a context, it is assumed that the attacker (usually a "legitimate" user or malicious software) may also control the execution environment. Such a user may examine the values being computed at any step of the function, and thus may be able to obtain secret information used in the cryptographic function. This is in contrast with the more traditional security model where the attacker is only given a black-box access (i.e., inputs/outputs) to the cryptographic function under consideration.

The main idea of white-box implementations is to rewrite a key-instantiated version so that all information related to the key is "hidden". In other words, for each secret key, a key-customized white-box implementation of the software is implemented so that the key input is unnecessary. Other white-box implementations allow for some sort of input to be used to allow for different secret keys to be used in a single white-box implementation based upon an input used to selected different key values.

Most symmetric block-ciphers, including the advanced encryption standard (AES) and the data encryption standard (DES), are implemented using substitution boxes and linear transformations. Imagine that such a cipher is white-box implemented as a huge lookup table taking on input any plaintext and returning the corresponding ciphertext for a given key. Observe that this white-box implementation has exactly the same security as the same cipher in the black-box context: the adversary learns nothing more than pairs of matching plaintexts/ciphertexts. Typical plaintexts being 64-bit or 128-bit values, such an ideal approach cannot be implemented in practice.

Current white-box implementations apply the above basic idea to smaller components of the cryptographic function. They may represent each component as a series of lookup tables and insert random input and output bijective encodings to the lookup tables to introduce ambiguity, so that the resulting algorithm appears as the composition of a series of lookup tables with randomized values.

It is common practice that a user requires a password in order to login to a specific service. However, when the password database is obtained various off-line attacks can be mounted (such as dictionary attacks or rainbow attacks). Even when countermeasures are applied, such as using a salt, then a (modified) brute-force search can be mounted. In cryptography, a salt is random data that is used as an additional input to a one-way function that "hashes" data, a password or passphrase. The primary function of salts is to defend against dictionary attacks or against its hashed equivalent, a pre-computed rainbow table attack. Salts are used to safeguard passwords in storage. A new salt is randomly generated for each password. The embodiments described herein demonstrate how to make such off-line attacks much more difficult. The embodiments described herein also show how one can use properties of white-box cryptography to protect entries in the stored database as well as making the off-line attacks more cumbersome by using the platform binding properties of the white-box implementation.

When a user wants to authenticate themselves to a service, typically, the cryptographic message digest H of this password p denoted as H(p) is stored in a database. In order to prevent against various off-line attacks (such as dictionary attacks or rainbow attacks), the hash of the password by itself is not stored, but a random user-specific salt s is appended to the password p as H(p||s) where || denotes concatenation. FIG. 1 illustrates the use of a salt in verifying a user password p. The service or system to be accessed by a password may include a password database 100. The password database may include user ID 105, salt value 110, authentication value 115, user data 1 120, and user data 2, 125. The user ID 105 may be a login ID or other identifier such as user name. The salt value 110 is a randomly generated value that is appended to the user password as described above. The authentication value 115 is the result of the hash function on the concatenation of the user password and the salt value 110. User data 1 120 and user data 2 125 are any data associated with the user that is collected and stored, for example a birthdate and an address. Other user data fields may be included as well. The password verification method includes the one way or hash function 130 receiving the user supplied password 135, retrieving the salt value 110 for the user, concatenating the user supplied password 135 and the salt value 110, and performing a hash on the concatenated value. The computed hash value is then compared by comparator 140 to the stored authentication value 115. When the computed hash value is equal to the stored authentication value 115 access is granted 145. When the computed hash value is not equal to the stored authentication value 115 access is not granted 150.

Further, when the database has been compromised then an adversary can mount a brute-force attack on specific users given the specification of the one-way function, the salt, and the authentication value.

This password verification method may be improved by using a dynamic white-box implementation {WB, Enc(K)} which implements the functionality of a chosen cryptographic cipher. For example, one has $$\text{Cipher}_K(x) = WB_{Enc(K)}(x)$$

for valid input values x, where $\text{Cipher}_K$ is a cryptographic encryption of the input value x using the key K, and $WB_{Enc(K)}$ is a white-box implementation of the $\text{Cipher}_K$ that receives an encoded version of the key Enc(K) and input values x as inputs. The idea is to use the salt as the encoded value of the cryptographic key to encrypt the user-supplied password. This means that the value for the key K should not be known by anyone. After the user sends a password $p_1$ to the server (protected by the network communication layer), the server computes $WB_s f(p_1)$) for the stored (or generated) salt s and checks if this equals the stored authentication value:

$$WB_s(f(p_1)) \stackrel{?}{=} A \ (= WB_{Enc(K)}(f(p)) = \text{Cipher}_K(f(p)))$$

where A is the stored authentication value, $f$ is some function which preprocesses the input password and the check is valid whenever p equals $p_1$. The function $f$ could be, for instance, the identity function or a cryptographic hash function in order to limit the output length of the symmetric cipher.

Figure 2:
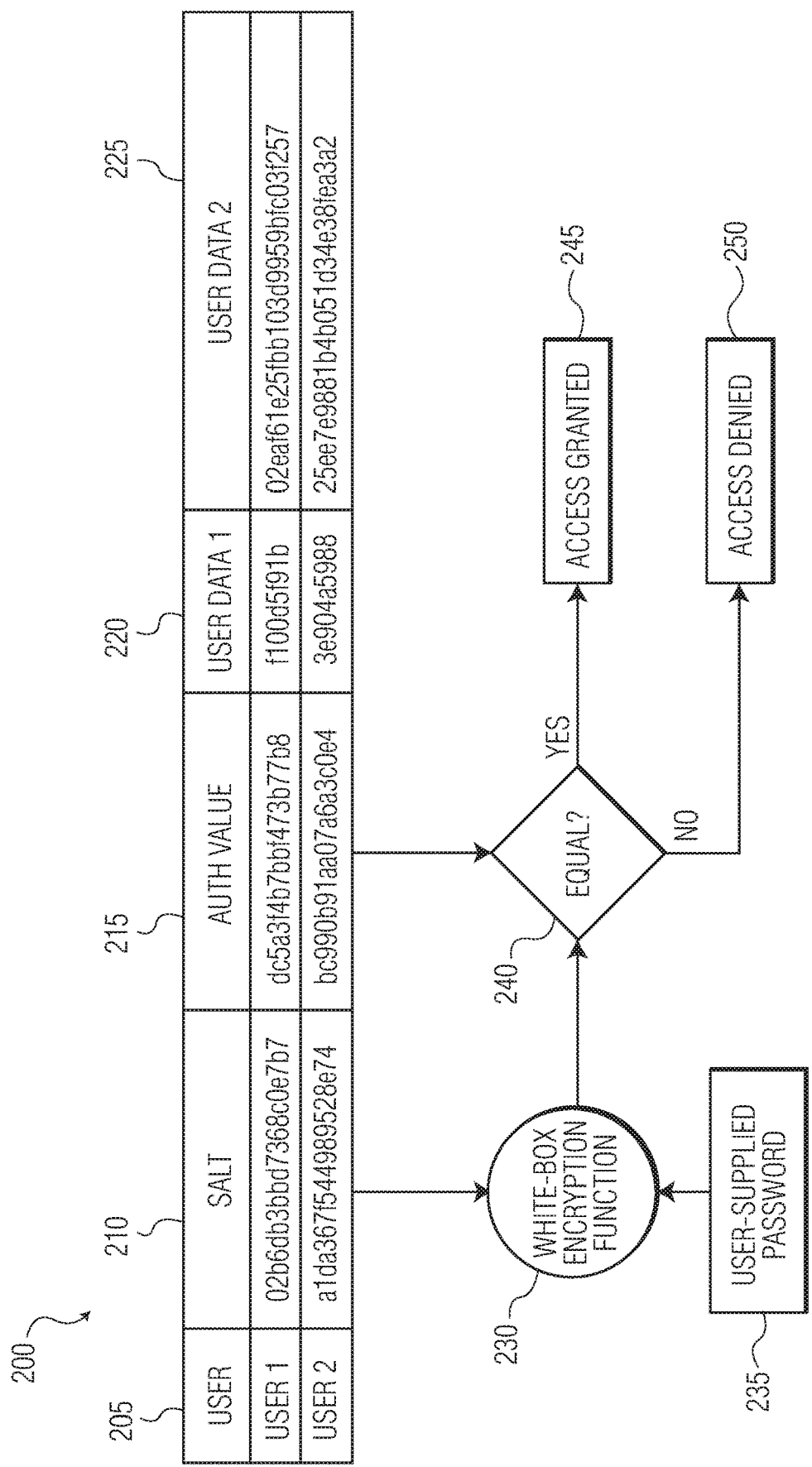
FIG. 2 illustrates the use of a salt and a white-box implementation of an encryption function in verifying a user password.

FIG. 2 illustrates the use of a salt and a white-box implementation of an encryption function in verifying a user password p. The elements in FIG. 2 correspond to the elements in FIG. 1 with a few differences. Instead of the hash function 130, the white-box implementation of the encryption function $WB_{Enc(K)}$ 230 is used along with the salt 210 as an encoded encryption key Enc(K). Also, the user data 1 220 and user data 2 225 may be encrypted to be more securely stored using the white-box implementation of the encryption function $WB_{Enc(K)}$ 230.

The embodiment of FIG. 2 has multiple advantages over the typical password system. First, this embodiment allows for the storage other user data in a secure manner by using the white-box implementation to encrypt the other user data. Further, when this database 200 is compromised, the adversary cannot simply launch a brute-force attack. In order to launch such an attack, the adversary needs to compute the Cipher together with the key K and many possible inputs. However, the key K is unknown: only the encoded value of this key is known as the salt. Hence, the adversary also needs to obtain the white-box implementation if they want to compute this off-line attack. The white-box implementation may include platform binding properties to prevent the adversary from simply copying and using the white-box implementation to carry out an attack. The platform binding properties mean that the white-box implementation will only compute valid output results which can be used for password authentication on the designated server and hence in such an attack.

The embodiments described herein solve the technological problem of implementing a password verification scheme using a white-box implementation. This is accomplished by using a white-box implementation of symmetric cipher using a salt value to generate an authentication value to verify that the entered password is correct. The white-box implementation of the symmetric cipher may use other white-box implementation techniques to make it harder for an attacker to attack the digital signature scheme such as using platform binding.

Figure 3:
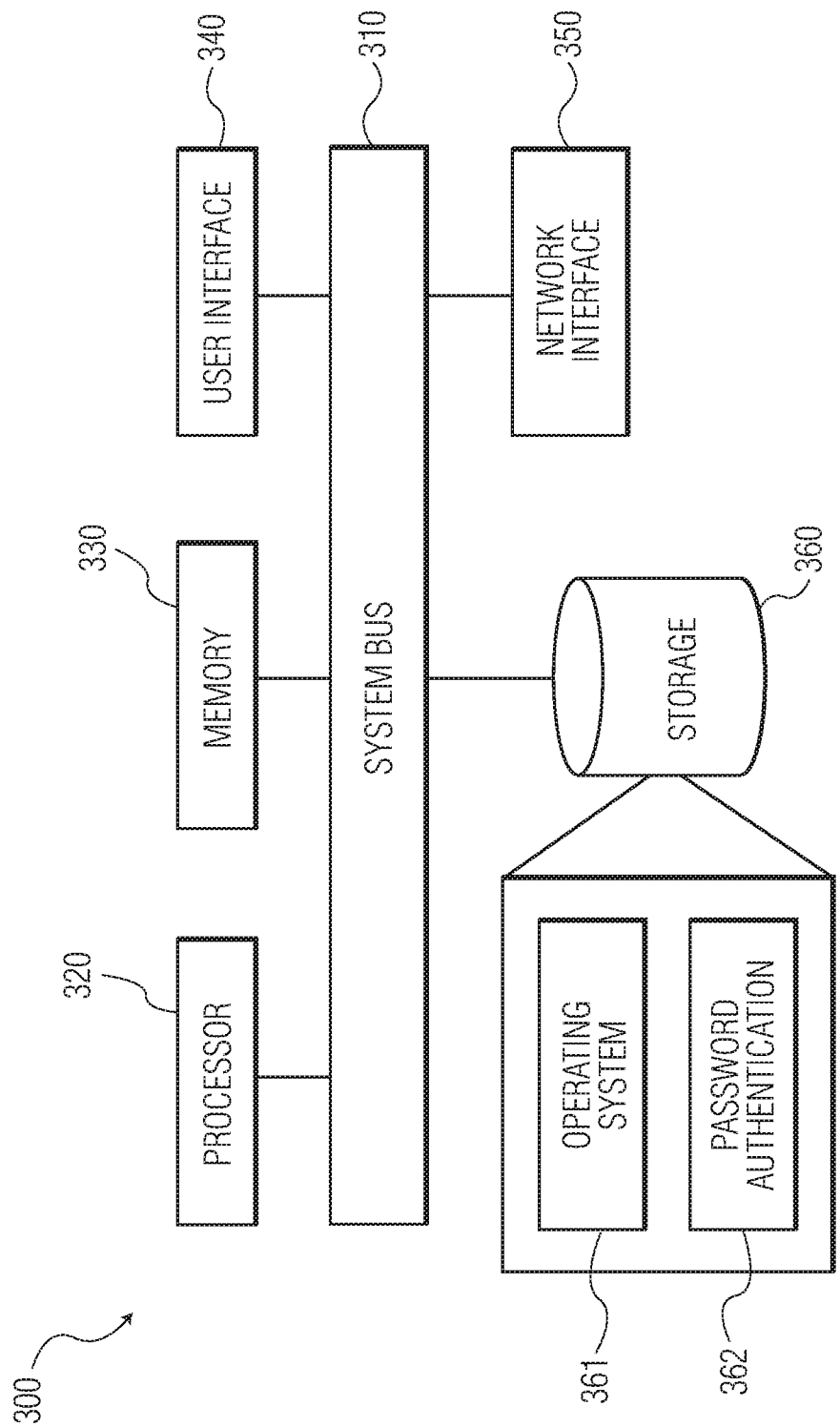
FIG. 3 illustrates an exemplary hardware diagram for implementing the embodiments for password authentication using white-box cryptography.

FIG. 3 illustrates an exemplary hardware diagram 300 for implementing the embodiments for password authentication using white-box cryptography described above. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands. In some embodiments, the user interface 340 may include a command line interface or graphical user interface that may be presented to a remote terminal via the network interface 350. In some embodiments, no user interface may be present.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. Further, software for authenticating the password 362.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A white-box system in a device having a hardware processor and a hardware memory, the white-box system for authenticating a user-supplied password, comprising:
   a password database stored in the hardware memory including a salt value and an authentication value for each user;
   a hash function implemented in the hardware processor and configured to hash the user-supplied password to produce a hashed user-supplied password;

a white-box implementation, in the hardware processor, of a symmetric cipher configured to produce an encrypted value by encrypting the hashed user-supplied password using the salt value associated with the user as an encoded secret key; and a comparator configured to compare the encrypted value with the authentication value associated with the user to verify the user-supplied password.

2. The system of claim 1, wherein the white-box implementation of the symmetric cipher is bound to a specific platform.

3. The system of claim 1, wherein the password database includes other user data that is encrypted using the white-box implementation of the symmetric cipher and the salt value associated with the user.

4. A method for authenticating a user-supplied password using a password database including a salt value and an authentication value for each user, comprising:

receiving the user-supplied password;

hashing the user-supplied password to produce a hashed user-supplied password;

encrypting, by a white-box implementation of a symmetric cipher, the hashed user-supplied password using the salt value associated with the user as an encoded secret key to produce an encrypted value; and comparing the encrypted value with the authentication value associated with the user to verify the user-supplied password.

5. The method of claim 4, wherein the white-box implementation of the symmetric cipher is bound to a specific platform.

6. The method of claim 4, further comprising encrypting other user data using the white-box implementation of the symmetric cipher and the salt value associated with the user.

7. A non-transitory machine-readable storage medium encoded with instructions for authenticating a user-supplied password using a password database including a salt value and an authentication value for each user, the non-transitory machine-readable storage medium comprising:

instructions for receiving the user-supplied password;

instructions for hashing the user-supplied password to produce a hashed user-supplied password;

instructions for encrypting, by a white-box implementation of a symmetric cipher, the hashed user-supplied password using the salt value associated with the user as an encoded secret key to produce an encrypted value; and instructions for comparing the encrypted value with the authentication value associated with the user to verify the user-supplied password.

8. The non-transitory machine-readable storage medium of claim 7, wherein the white-box implementation of the symmetric cipher is bound to a specific platform.

9. The non-transitory machine-readable storage medium of claim 7, further comprising instructions for encrypting other user data using the white-box implementation of the symmetric cipher and the salt value associated with the user.

* * * * *